United States Patent [19]

Kobayashi et al.

[11] Patent Number: 4,631,610

[45] Date of Patent: Dec. 23, 1986

[54] MULTICHANNEL MAGNETIC HEAD SUPPORTING MECHANISM

[75] Inventors: Akira Kobayashi; Fukashi Yanagisawa, both of Nagano, Japan

[73] Assignee: Kabushiki Kaisha Sanyo Seiki Seisakusho, Nagano, Japan

[21] Appl. No.: 842,063

[22] Filed: Mar. 18, 1986

Related U.S. Application Data

[63] Continuation of Ser. No. 456,905, Jan. 10, 1983, abandoned.

[30] Foreign Application Priority Data

Jan. 18, 1982 [JP] Japan .................................. 57-5549

[51] Int. Cl.⁴ .................................................. G11B 5/48
[52] U.S. Cl. ..................................... 360/104; 360/121
[58] Field of Search ................... 360/2, 88, 104, 105, 360/109, 121; 369/255

[56] References Cited

U.S. PATENT DOCUMENTS

| | | | |
|---|---|---|---|
| 2,993,698 | 7/1961 | Stanton | 369/255 X |
| 3,460,244 | 8/1969 | Metz | 360/121 X |
| 3,588,379 | 6/1971 | Young | 360/88 |
| 3,787,637 | 1/1974 | McCarty | 360/104 X |
| 4,167,766 | 9/1979 | Chan | 360/104 |
| 4,363,045 | 12/1982 | Herman | 360/104 |

*Primary Examiner*—A. J. Heinz
*Attorney, Agent, or Firm*—Sughrue, Mion, Zinn, Macpeak & Seas

[57] ABSTRACT

A magnetic head supporting mechanism for a card reader or the like allows the heads to "float," that is, to move in a direction normal to the surface of the card to compensate for warp or irregular curvature of the card while maintaining good contact between the head and the magnetic recording media.

10 Claims, 5 Drawing Figures

MULTICHANNEL MAGNETIC HEAD SUPPORTING MECHANISM

This is a continuation, of application Ser. No. 456,905 filed Jan. 10, 1983 and now abandoned.

BACKGROUND OF THE INVENTION

This invention relates to a multichannel magnetic head supporting mechanism for use, for instance, in a magnetic card reader or the like.

Recently a multichannel card reader has been used in a cash card system in preference to a single track specialized machine because of its versatility in expansion and mixing of various usages. In this case, the head must be formed as a multichannel construction. However, when deformation or bending occurs in the card constituting the recording medium, uniform contact between the card and the component magnetic heads is difficult to realize, thus making it difficult to obtain correct recording on an reproduction of the card. Any attempt to correct the deformation of the card forcibly for realizing uniform contact would necessitate an extremely strong compressive force which in turn requires a powerful card driving source and a very rugged head frame, which are not practical.

U.S. Pat. No. 4,028,734 entitled "PLURAL MAGNETIC HEAD ASSEMBLY WITH INDEPENDENT SUPPORTING STRUCTURE" discloses a construction wherein a number of magnetic heads are provided separately for a plurality of channels, and wherein the magnetic head are made contactable with the card in a sliding manner.

Although such a conventional construction permits vertical movement of the magnetic head with respect to the surface of the card, it prohibits other movement, thus making it impossible to completely follow the curved surface of a bent card. Furthermore, since the magnetic heads for a number of channels are held in a single head block, the mechanism involving the head block requires a large space, rendering the replacement of the magnetic head difficult, and making the construction uneconomical.

SUMMARY OF THE INVENTION

A primary object of the present invention is to provide a supporting mechanism for a multichannel magnetic head, wherein the magnetic head provided for a number of channels are movable independently of each another and in not only a direction vertical to the surface of the card but also in a direction contained in a plane perpendicular to the surface of the card, and wherein the follow-up property of the head along the surface of the card is thereby improved.

Another object of the invention is to provide a supporting mechanism for a multichannel magnetic head, wherein each magnetic head can be easily replaced while the size of the mechanism is minimized.

BRIEF DESCRIPTION OF THE DRAWINGS

The invention will now be described in detail with reference made to the accompanying drawings, in which.

DETAILED DESCRIPTION OF THE PREFERRED EMBODIMENTS

Figure 1:
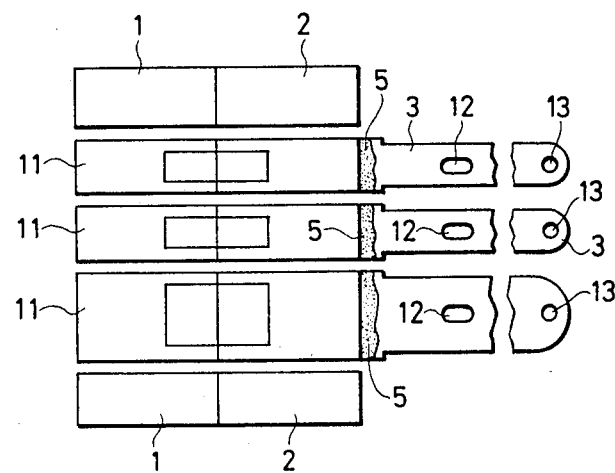
FIG. 1 is a front view showing one example of the construction of magnetic head portion used in the present invention.
Figure 2:
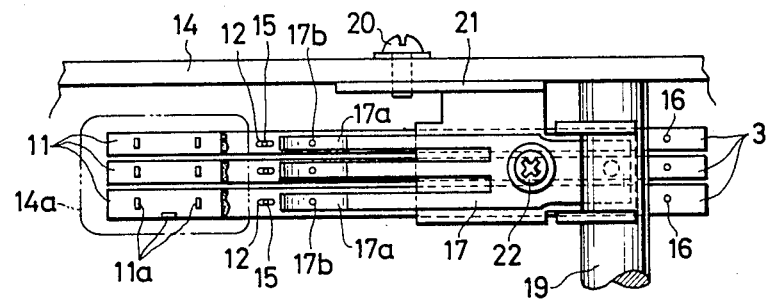
FIG. 2 is a rear view of an embodiment of the present invention.
Figure 3:
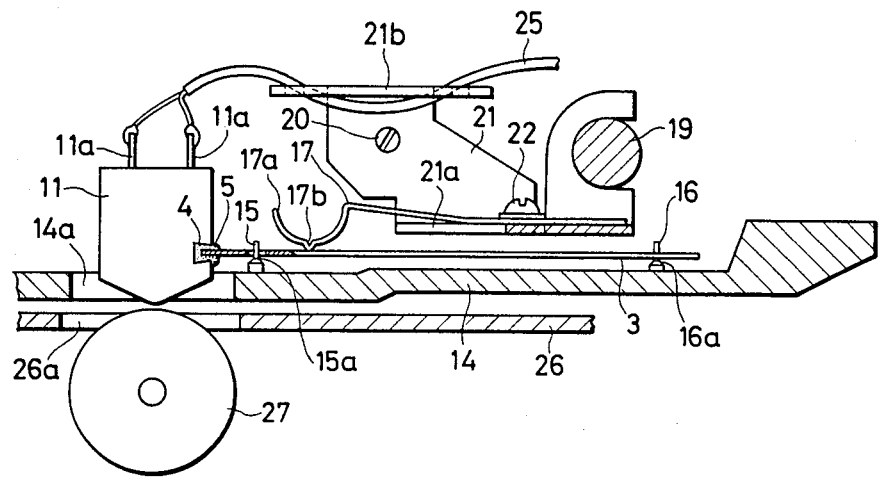
FIG. 3 is a plan view showing the same embodiment.

In FIG. 1, 2 and 3, there are illustrated magnetic heads 11 corresponding to, for instance, three channels, each having a recess 4 of a dovetail shape, and three head supporting plates 3 each having an end inserted into the recess 4 and secured therein by plastic resin 5, so that the supporting plates 3 extend horizontally from one side of the magnetic heads 11.

Although the production of the magnetic heads is not restricted, an integral core holder 1 corresponding to the left halves of the magnetic heads and another integral core holder 2 corresponding to the right halves of the same may be combined together into a single body. Front end portions of cores wound with head windings beforehand are inserted into three windows provided in the single body, void spaces in the single body are then filled with a plastic resin, and the single body thus filled and solidified is cut into separate planar magnetic heads as shown in FIG. 1.

A hole 12 elongated in its longitudinal direction and a round hole 13 are provided in each head supporting plate 3 at respective positions adjacent to an end of the plate 3 secured to the magnetic head 11 and adjacent to the other end of the same plate. The holes 12 and 13 are penetrated by projections 15 and 16 secured to a frame 14 forming a card passage. The stem portions of the projections 15 and 16 are formed conically and adapted to support the head supporting plate 3 such that the plate 3 may swing in a plane perpendicular to the surface of the card. Furthermore, since the hole 12 engaging the projection 15 is elongated in the length direction of the head supporting plate 3, each of the magnetic heads secured to the head supporting plate 3 is thereby allowed to move independently up and down in a plane perpendicular to the surface of the card along the surface of the card. Since the pin-shaped ends of the projections 15 and 16 extend upwardly beyond the thickness of the head supporting plate 3 and the projections 15 and 16 each have also conical supporting portions 15a and 16a, respectively, each of the heads secured to the plate 3 is swingable independently around the longitudinal center axis of the head supporting plate 3 to comply with the card surface. Namely, the heads 11 are each movable up and down and simultaneously therewith, swingable normally to the card surface. With the above described construction, each magnetic head 11 can follow the surface of even a bent card with high fidelity.

Rearwardly of a part of the head supporting plates 3 disposed away from the magnetic heads 11, an auxiliary member 21 is secured to a stationary member such as a frame 14 by means of a guide bar 19 and a mounting screw 20. The auxiliary member 21 has a portion 21a folded at right angles along a line extending in parallel with the head supporting plates 3. A leaf spring 17 is secured to the portion 21a of the auxiliary member 21 by mounting screw 22. A forward half of the leaf spring 17 adjacent the magnetic heads 11 is divided in three arms each having an arcuate end portion 17a provided with a semispherical projection 17b. Under the force of the leaf spring 17 applied through the projections 17b to side surfaces of the head supporting plates 3, the head supporting plates 3 are firmly held against the projections 15 and 16. Because the spring force is applied through point contact at the projections 17b, the aforementioned movements of the magnetic head and therefore a precise followup characteristic thereof can be realized thereby.

On the front side of the frame 14, there is provided another frame 26 extending in parallel with the frame 14 so that a card passage is formed between the two frames 14 and 26. The front ends of the magnetic heads 11 project through a window 14a formed in the frame 14 into the card passage, while a peripheral part of a pad roller 27 projects backwardly into the card passage through a window 26a formed in the frame 26 at a position opposing the magnetic heads, so that the pad roller 27 forces the card passing through the passage toward the magnetic heads 11.

Figure 4:
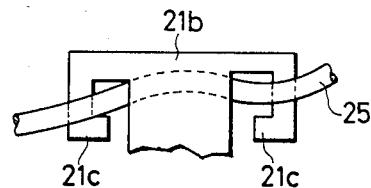
FIG. 4 is a rear view showing one part of the device of FIG. 3.

A part 21b bent backwardly along a folding line is formed with two hooks 21c, and lead wires 25 connected to the terminals 11a of the magnetic heads 11 are supported by the hooks 21c of the auxiliary member 21, as shown in FIG. 4.

It is preferable that the semispherical projection 17b of the leaf spring 17 abut against the corresponding head supporting plate 3 at a position along a center line of the same for the purpose of applying an appropriate outward bias to the magnetic head 11. However, the abutment position may be displaced to some extent from the center line as long as this displacement does not disturb the aforementioned horizontal movement, etc. of the magnetic head 11.

In the above description, the head supporting plates are secured to the magnetic head with a plastic resin bonding agent applied therebetween. However, such a securing method is not restrictive, and various other methods may also be utilized to long as the two members can be joined together reliably.

Figure 5:
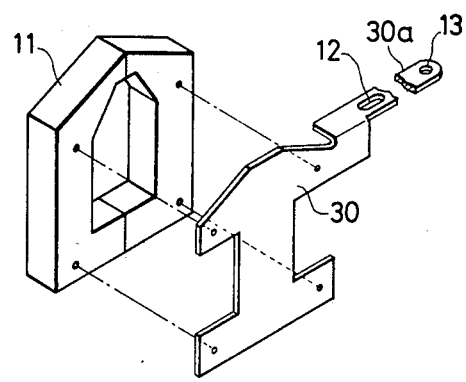
FIG. 5 is an exploded presepctive view showing another example of the construction of the magnetic head portion used in the present invention.

For instance, a head supporting plate 30 as shown in FIG. 5 having a flat stem portion and an arm portion 30a may be utilized for this purpose, with the stem portion secured directly to one side surface of the magnetic head 11 by spot welding, for example. An elongated hole 12 and a round hole 13 are formed through the arm poriton 30a of the head supporting plate 30, and brought into engagement with the aforementioned projections 15 and 16, respectively.

According to the present invention, since the magnetic heads 11 are made to be three dimensionally operable, the heads can follow any irregularity appearing on the surface of the card, and enables accurate reproduction of signals on the card. Furthermore, the magnetic head is combined with the head supporting plate, and therefore replacement can easily be accomplished by replacing the entire combination of the magnetic head and the head supporting plate with a new combination. In addition, since no specific head block or the like is required for supporting magnetic heads for a plurality of tracks, the size of the head supporting mechanism can be minimized.

What is claimed is:

1. A multichannel magnetic head supporting mechanism, comprising:

a plurality of magnetic heads, a plurality of associated head supporting members connected to and supporting said magnetic heads, each of said supporting members being independent of one another, and each having a longitudinal centerline normally falling in a first plane, said head supporting members each supporting a magnetic head at a position which is on said centerline, said supporting members further including two insertion apertures on said centerline, a plurality of associated holding members mounted on a stationary support structure for independently holding said supporting members, each of said holding members having a first portion which is receivable into a respective insertion aperture of one of said supporting members and a cone-shaped portion having a diameter which is larger than said insertion aperture, said holding members holding said supporting members in such a manner that at least two holding members hold an associated supporting member, said plurality of holding members being arranged in a plurality of lines, each of which is formed by said at least two holding members holding an associated supporting member, said lines being parallel to one another, said holding members holding said supporting members in such a manner that each of said first portions of said holding members movably penetrates an associated insertion aperture of a supporting member and such that each of said cone-shaped portions of said holding members abut against sides of said insertion aperture so that said supporting members may move in a direction normal to a recording medium and swing with respect to said first plane, and means for biasing said head supporting members generally toward said recording medium, said biasing means comprising a plurality of independently movable biasing members provided in a number equal to that of said supporting members, each of said biasing members being in contact with its associated supporting member such that said supporting members are urged toward said recording medium while allowing longitudinal swinging of said supporting members.

2. A device as claimed in claim 1, each of said supporting members comprising an elongated plate having one end fixedly secured to its associated magnetic head.

3. A device as claimed in claim 1, wherein each of said biasing members includes a projection thereon, said biasing means biasing each supporting member in such a manner that said projection of said biasing means contacts a portion which is on said centerline of the associated supporting member so that said supporting members can be urged toward said recording medium without disturbance of said longitudinal swinging of said supporting members.

4. A device as claimed in claim 2, said biasing means comprising leaf spring means for urging said supporting members in a direction such that said heads are urged into contact with said recording medium, said spring means engaging said supporting members in substantially point contact via said projections.

5. A device as claimed in claim 1, said supporting members being cemented to sides of said heads.

6. A device as claimed in claim 1, said biasing means urging said heads into contact with said recording medium, and said biasing means and said head supporting members allowing said heads to follow an irregular curvature of said recording medium.

7. A device as claimed in claim 1, said supporting members including plate portions affixed to and in surface contact with said heads, and elongated portions extending from sides of said heads and supported by said holding members.

8. A device as claimed in claim 1, said stationary support structure including an aperture through which said heads may protrude located in a line with said projections, said supporting members extending from sides of said heads and individually having a width approximately equal to that of a head.

9. A device as claimed in claim 1, said aperture in said supporting member formed nearest said head being elongated in a longitudinal direction of said supporting members.

10. A device as claimed in claim 1, said biasing means including spring means mounted at one end to a support, said support including means for engaging and supporting lead wires running to said heads.

* * * * *